US008638023B2

(12) United States Patent
Liu et al.

(10) Patent No.: US 8,638,023 B2
(45) Date of Patent: Jan. 28, 2014

(54) ULTRASONIC OSCILLATING DEVICE WITH A DETACHABLE ULTRASONIC OSCILLATING ASSEMBLY

(75) Inventors: Ta-Chuan Liu, Tainan (TW); Hsueh-Ko Liao, Tainan (TW)

(73) Assignee: Drytech Corporation Ltd., Tainan (TW)

( * ) Notice: Subject to any disclaimer, the term of this patent is extended or adjusted under 35 U.S.C. 154(b) by 111 days.

(21) Appl. No.: 13/433,455

(22) Filed: Mar. 29, 2012

(65) Prior Publication Data
US 2013/0113341 A1   May 9, 2013

(30) Foreign Application Priority Data

Nov. 9, 2011   (TW) .............................. 100221101 U

(51) Int. Cl.
*H01L 41/08* (2006.01)
(52) U.S. Cl.
USPC ...................... 310/323.01; 310/321; 310/348
(58) Field of Classification Search
USPC ..................................... 310/321, 323.01, 328
See application file for complete search history.

(56) References Cited

U.S. PATENT DOCUMENTS

| 7,083,860 | B2 * | 8/2006 | Maus et al. | 428/593 |
| 7,607,332 | B2 * | 10/2009 | Choe et al. | 72/342.6 |
| 7,684,735 | B2 * | 3/2010 | Ino et al. | 399/173 |
| 8,410,669 | B2 * | 4/2013 | Yu et al. | 310/363 |

* cited by examiner

*Primary Examiner* — Mark Budd
(74) *Attorney, Agent, or Firm* — Rosenberg, Klein & Lee

(57) ABSTRACT

An ultrasonic oscillating device with a detachable ultrasonic oscillating assembly is mounted inside a case having a detachable lid and applied in a humidifier. The ultrasonic oscillating device has a circuit board, a supporting board, a connecting structure and the ultrasonic oscillating assembly. The detachable ultrasonic oscillating assembly is placed between the supporting board and the lid. The connecting structure is mounted on a bottom of the lid and electrically connected to the ultrasonic oscillating assembly and the circuit board. When the ultrasonic oscillating assembly is broken, users easily replace the broken ultrasonic oscillating assembly by the detachable ultrasonic oscillating assembly and the detachable lid of the case, so other unbroken parts remain useful.

16 Claims, 13 Drawing Sheets

US 8,638,023 B2

ULTRASONIC OSCILLATING DEVICE WITH A DETACHABLE ULTRASONIC OSCILLATING ASSEMBLY

BACKGROUND OF THE INVENTION

1. Field of the Invention

This invention relates to a humidifier; especially the humidifier is installed in a case with a detachable lid. The humidifier transforms water into steam by an ultrasonic oscillating device with a detachable ultrasonic oscillating assembly.

2. Description of Related Art

A conventional humidifier for increasing an indoor humidity has a case, a circuit board and an ultrasonic oscillating assembly. The circuit board and the ultrasonic oscillating assembly are mounted in the case. The circuit board and the ultrasonic oscillating assembly are electrically connected together.

After water is injected to a chamber in which the ultrasonic assembly is placed or water is guided to the ultrasonic assembly via a water absorbing assembly, the circuit board outputs a voltage to the ultrasonic assembly so that ultrasonic assembly can transform the water to steam to increase the humidity in the air.

The ultrasonic oscillating assembly has multiple micro-holes. After the humidifier has been used for a long time, the multiple micro-holes will be blocked by impurity in the water to disable the spray function. The ultrasonic oscillating assembly is fixed inside the case, so users cannot replace the ultrasonic oscillating assembly by themselves. When the ultrasonic oscillating assembly of the humidifier is broken, the whole humidifier will have to be discarded, and this causes a waste of resources.

SUMMARY OF THE INVENTION

In a conventional ultrasonic oscillating assembly, when the ultrasonic oscillating assembly installed in a humidifier is broken, the broken ultrasonic oscillating assembly cannot be detached from the humidifier. The whole humidifier will be discarded, so the other unbroken parts cannot be used, and this causes a waste issue. To reduce the waste issue, an objective of this invention is to provide an ultrasonic oscillating device with a detachable ultrasonic oscillating assembly.

The ultrasonic oscillating device with a detachable ultrasonic oscillating assembly can be applied in a humidifier. The ultrasonic oscillating device is mounted inside a case. The case has a detachable lid. A spraying hole is formed through the lid. The ultrasonic oscillating device comprises a circuit board, a supporting board, an ultrasonic oscillating assembly, and a connecting structure. The supporting board has a supporting part. The detachable ultrasonic oscillating assembly can be assembled on the supporting part of the supporting board, and placed under the lid of the case. The ultrasonic oscillating assembly comprises a metal sheet having a spraying area with multiple micro-holes and an ultrasonic oscillator combined with the metal sheet. The connecting structure is formed under the lid and electrically connected to the ultrasonic oscillator and the circuit board.

The ultrasonic oscillating device with a detachable ultrasonic oscillating assembly is placed between the lid and the supporting board, and the lid of the case is a detachable structure. Multiple connecting elements are mounted under the lid and electrically connected to the ultrasonic oscillating assembly and the circuit board, so the ultrasonic oscillating assembly can be controlled to oscillate between the supporting board and the lid. As mentioned above, when water is around the spraying area of the metal sheet of the ultrasonic oscillating assembly, the water can be transformed to steam. On the other hand, when the ultrasonic oscillating assembly is broken, users can take off the lid of the case and replace the broken ultrasonic oscillating assembly by a new one, so the humidifier still can be used.

DETAILED DESCRIPTION OF PREFERRED EMBODIMENT

Figure 1:
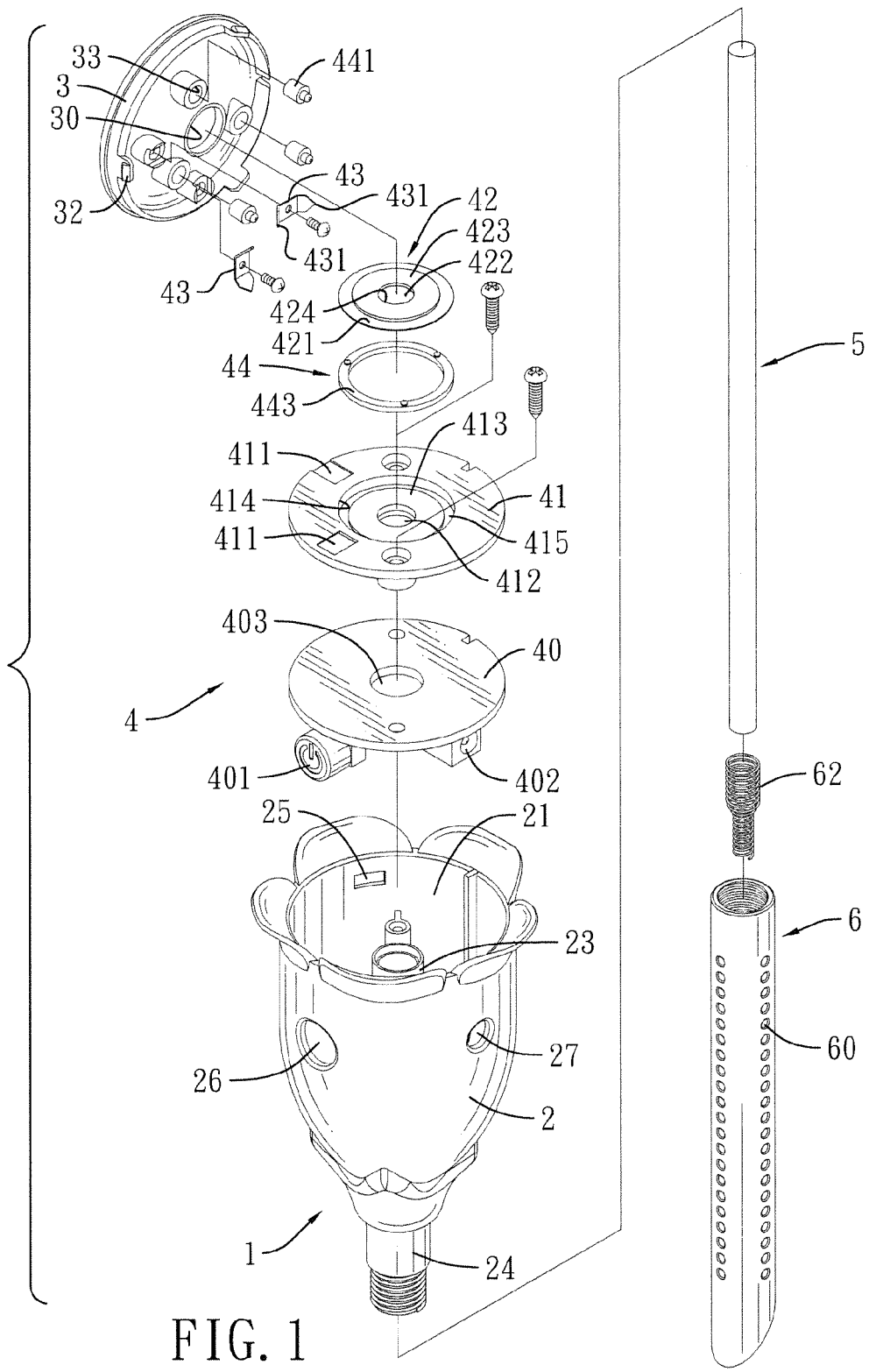
FIG. 1 is an exploded perspective view of a humidifier comprising a case, a water absorbing assembly, a water filtering assembly, and a first embodiment of an ultrasonic oscillating device of this invention.

FIGS. 1, 5, 7 and 11 show multiple embodiments of an ultrasonic oscillating device 4 with a detachable ultrasonic oscillating assembly 42. Each of the multiple embodiments further comprises a case 1, a water absorbing assembly 5, and a water filtering assembly 6 to form different types of humidifiers.

Figure 3:
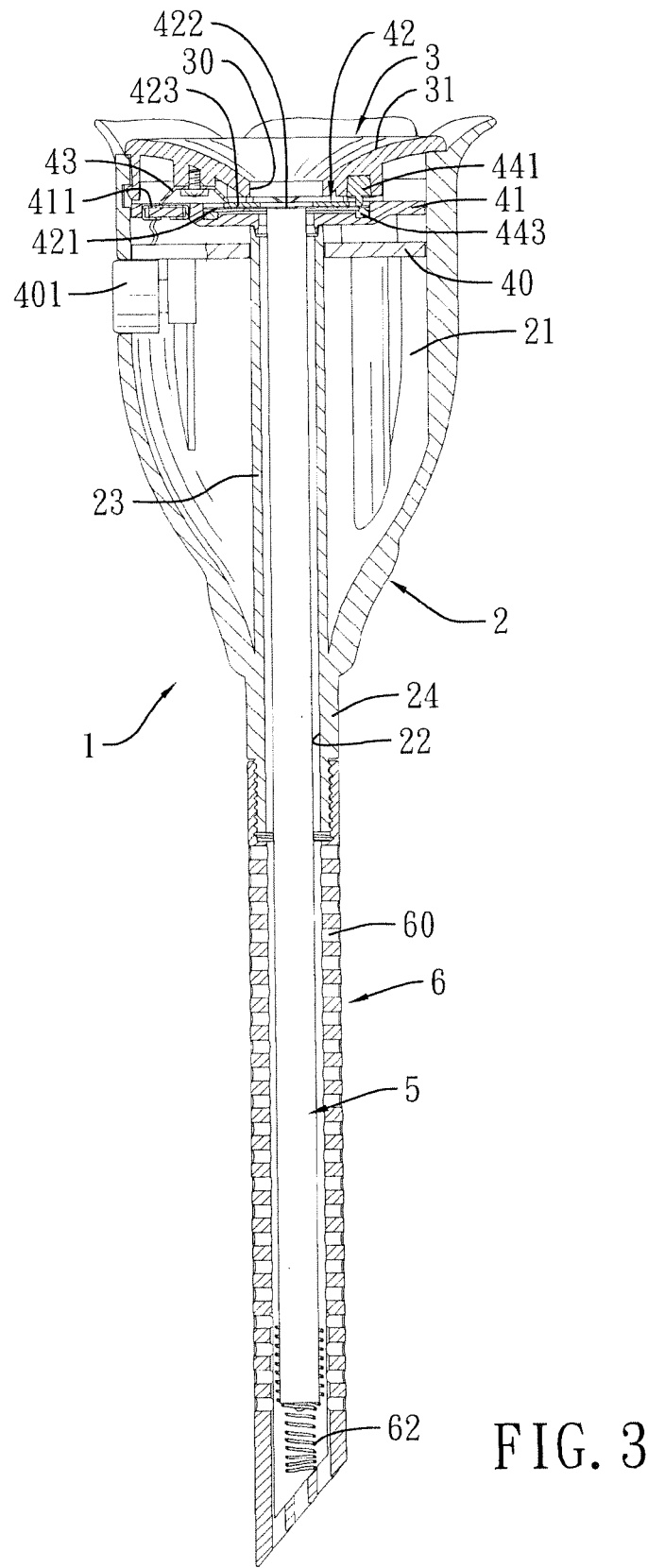
FIG. 3 is a cross sectional view of the first embodiment of the ultrasonic oscillating device comprising a case, a water absorbing assembly, and a water filtering assembly in FIG. 1.

As shown in FIGS. 1 and 3, the case 1 comprises a first base 2 and a lid 3. The lid 3 is detachable and placed on a top of the first base 2. A space 21 is formed between the first base 2 and the lid 3. A base hole 22 is formed through a bottom of the first base 2 and communicates with the space 21. A spraying hole 30 is formed through the lid 3.

Inside the case 1, the first base 2 has a top opening communicating with the space 21. The base hole 22 upwardly communicates with the space 21. In this embodiment, an extending tube 23 is mounted inside the space 21 of the first base 2. A connecting tube 24 is formed under the bottom of the first base 2. The base hole 22 communicates with the connecting tube 24 and the extending tube 23. External threads are formed around an outer surface of the connecting tube 24. The case 1 can be in a shape of flowers for decoration.

Inside the said case 1, a funnel-shaped surface 31 is formed around a top of the spraying hole 30 on a top of the lid 3. The lid 3 and the first base 2 are assembled together by connector mounting or screwing. With reference to FIG. 1, multiple mounting recesses 25 are formed in an inner surface of the first base 2. Multiple mounting protrusions 32 correspond to the multiple mounting recesses 25 and are formed around the lid 3. When the lid 3 is assembled on the top of the first base 2, the multiple mounting protrusions 32 and the multiple mounting recesses 25 are respectively mounted together. However, the lid 3 still can be detached from the top of the first base 2.

The ultrasonic oscillating device 4 is placed inside the space 21 of the case 1 and under the lid 3. The ultrasonic oscillating device 4 comprises a circuit board 40, a supporting board 41, the ultrasonic oscillating assembly 42 and a connecting structure. FIGS. 1 and 3 show a first embodiment of the ultrasonic oscillating device 4. The connecting structure has two connecting elements 43 such as two conductive metal sheets or two metal contacts.

The supporting board 41 has a supporting part 413. The detachable ultrasonic oscillating assembly 42 can be assembled on the supporting part 413 of the supporting board 41 and under the lid 3 of the case 1, so the ultrasonic oscillating assembly 42 can oscillate between the supporting board 41 and the lid 3. The ultrasonic oscillating assembly 42 comprises a metal sheet 421 and an ultrasonic oscillator 423 mounted on the metal sheet 421. The metal sheet 421 has a spraying area 422 corresponding to the spraying hole 30 of the lid 3. There are multiple micro-holes distributed over the spraying area 422. The two connecting elements 43 are mounted under the lid 3 for electrically connecting to the ultrasonic oscillating assembly 42 and the circuit board 40.

Figure 2:
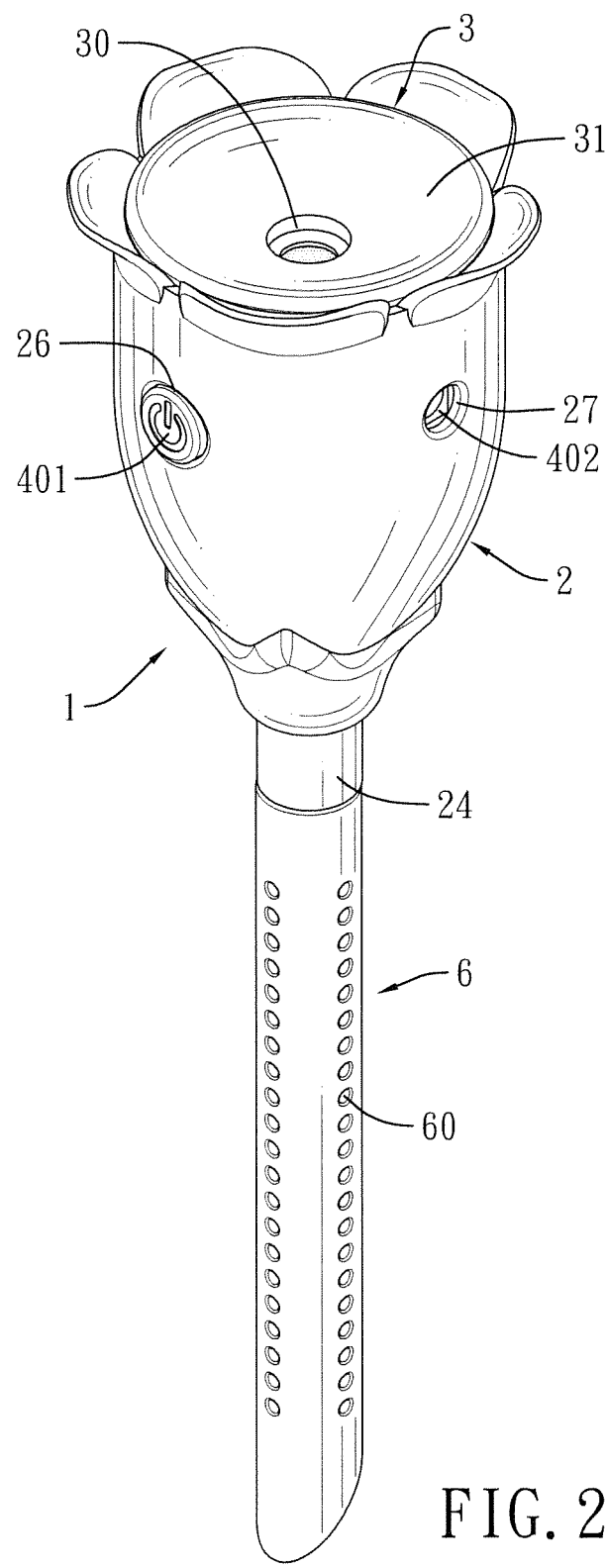
FIG. 2 is a perspective view of the first embodiment of the ultrasonic oscillating device comprising a case, a water absorbing assembly, and a water filtering assembly in FIG. 1.

With reference to FIGS. 1, 2 and 3, the circuit board 40 comprises a switch 401 and a power connector 402. The switch 401 and the power connector 402 are exposed from the first base 2. A first hole 26 and a second hole 27 are formed through the first base 2. The switch 401 and the power connector 402 are exposed out of the first base 2 respectively through the first hole 26 and the second hole 27, so the power connector 402 can be connected to an external power. A circuit hole 403 is formed through the circuit board 40 for allowing the extending tube 23 of the first base 2 to protrude through the circuit hole 403.

The supporting board 41 is mounted on the circuit board 40. Both of the supporting board 41 and the circuit board 40 are fixed together on the first base 2 by screwing. The supporting board 41 has two connecting terminals 411 and a supporting hole 412. The two connecting terminals 411 are separately mounted around the supporting part 413 on the supporting board 41. The supporting hole 412 is formed through the supporting part 413 of the supporting board 41. A circular groove 414 is formed on a top of the supporting part 413. The two connecting terminals 411 are respectively and electrically connected to two corresponding contacts of the circuit board 40 by wires or conductive elements. The extending tube 23 of the first base 2 is connected to the supporting hole 412 through the circuit hole 403 of the circuit board 40.

In the ultrasonic oscillating assembly 42, the ultrasonic oscillator 423 can have a center hole 424 to form an annular structure. The ultrasonic oscillator 423 is smaller than the metal sheet 421 in size and is mounted on a central top of the metal sheet 421. The center hole 424 of the ultrasonic oscillator 423 corresponds to the spraying area 422 of the metal sheet 421. The metal sheet 421 is placed in the circular groove 414 of the supporting part 413 of the supporting board 41.

The connecting structure is mounted on a bottom of the lid 3, so the connecting structure can be moved with the lid 3. The connecting structure is electrically connected to the ultrasonic oscillating assembly 42 and the circuit board 40. The connecting structure has at least one connecting element 43 that can be a conductive metal sheet of or a metal contact.

In FIGS. 1 and 3, the connecting structure has two connecting elements 43 in the form of conductive metal sheets. The two connecting elements 43 are respectively mounted on the bottom of the lid 3, and respectively connected between the two connecting terminals 411 of the supporting board 41 and the ultrasonic oscillating assembly 42. Therefore, the ultrasonic oscillating assembly 42 is electrically connected to the circuit board 40 by the two connecting elements 43 and the two connecting terminals 411 of the supporting board 41. The ultrasonic oscillator 423 receives a voltage from the circuit board 40 for generating ultrasonic oscillations to transform water or liquid to steam.

In this embodiment, the two connecting elements 43 are two conductive metal sheets and are mounted on the bottom of the lid 3 by screwing. Two ends of each connecting element 43 are bent downward as two touching terminals 431. One of the connecting elements 43 is electrically connected between one of the connecting terminals 411 of the supporting board 41 and the ultrasonic oscillator 423 by its two touching terminals 431. The other connecting element 43 is electrically connected between the other connecting terminal 411 of the supporting board 41 and the metal sheet 421 by its two touching terminals 431.

With reference to FIGS. 1, 3, 5 and 6, the ultrasonic oscillating device 4 can further comprise an elastic positioning assembly 44. The elastic positioning assembly 44 comprises at least one upper elastic positioning element 441 and at least one lower elastic positioning element 443. The upper elastic positioning element 441 is mounted between the bottom of the lid 3 and a top surface of the ultrasonic oscillating assembly 42. The lower elastic positioning element 443 is mounted between the top surface of the supporting board 41 and the bottom surface of the ultrasonic oscillating assembly 42. The ultrasonic oscillating assembly 42 is positioned between the supporting part 413 of the supporting board 41 and the lid 3 of the case 1, so the ultrasonic oscillating assembly 42 can be controlled to oscillate between the supporting board 41 and the lid 3.

Figure 4:
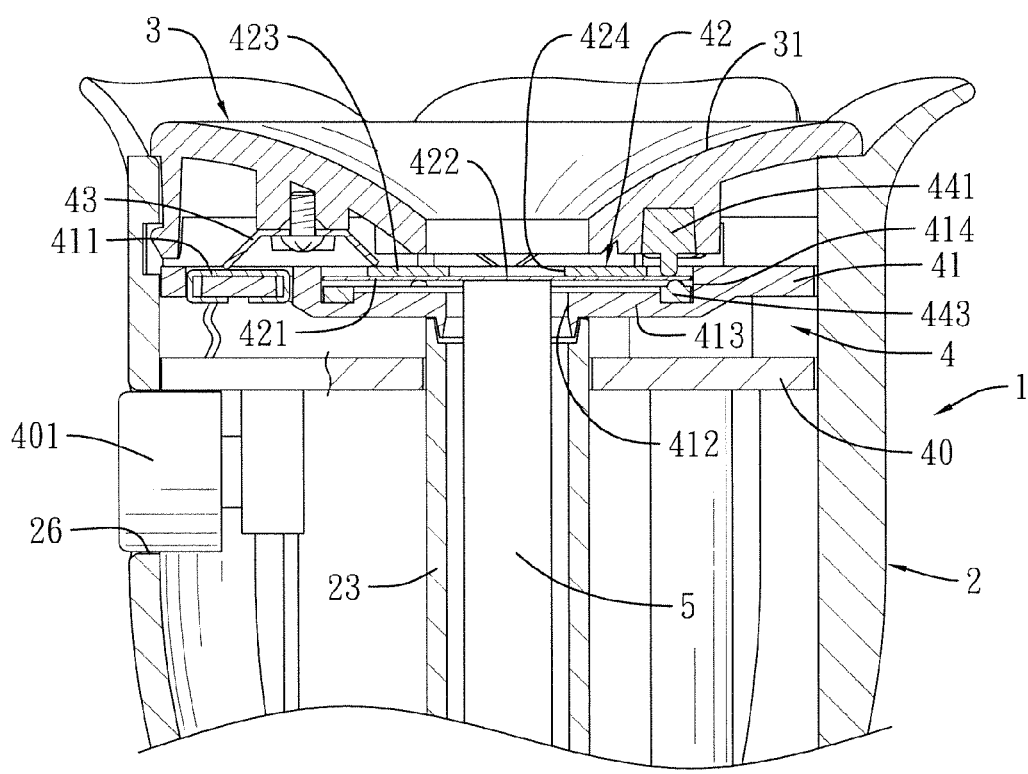
FIG. 4 is an enlarged cross sectional view of the first embodiment of the ultrasonic oscillating device comprising a case, a water absorbing assembly, and a water filtering assembly in FIG. 3.

FIGS. 1, 3 and 4 show the first embodiment. The elastic positioning assembly 44 comprises multiple columnar upper elastic positioning elements 441 and an annular lower elastic positioning element 443. An annular groove 415 is formed in the circular groove 414 of the supporting part 413. The annular lower elastic positioning element 443 is mounted in the annular groove 415. A bottom surface of the metal sheet 421 of the ultrasonic oscillating assembly 42 is abutted against a top surface of the annular lower elastic positioning element 443. There are multiple first positioning grooves 33 formed on the bottom of the lid 3 around the spraying hole 30. The multiple columnar upper elastic positioning elements 441 are respectively mounted in the corresponding multiple first positioning grooves 33. The multiple columnar upper elastic positioning elements 441 are abutted against a top surface of the metal sheet 421 of the ultrasonic oscillating assembly 42, so the ultrasonic oscillating assembly 42 is separated from a bottom surface of the circular groove 414 of the supporting part 413 of the supporting board 41 and the bottom surface of the lid 3.

Figure 5:
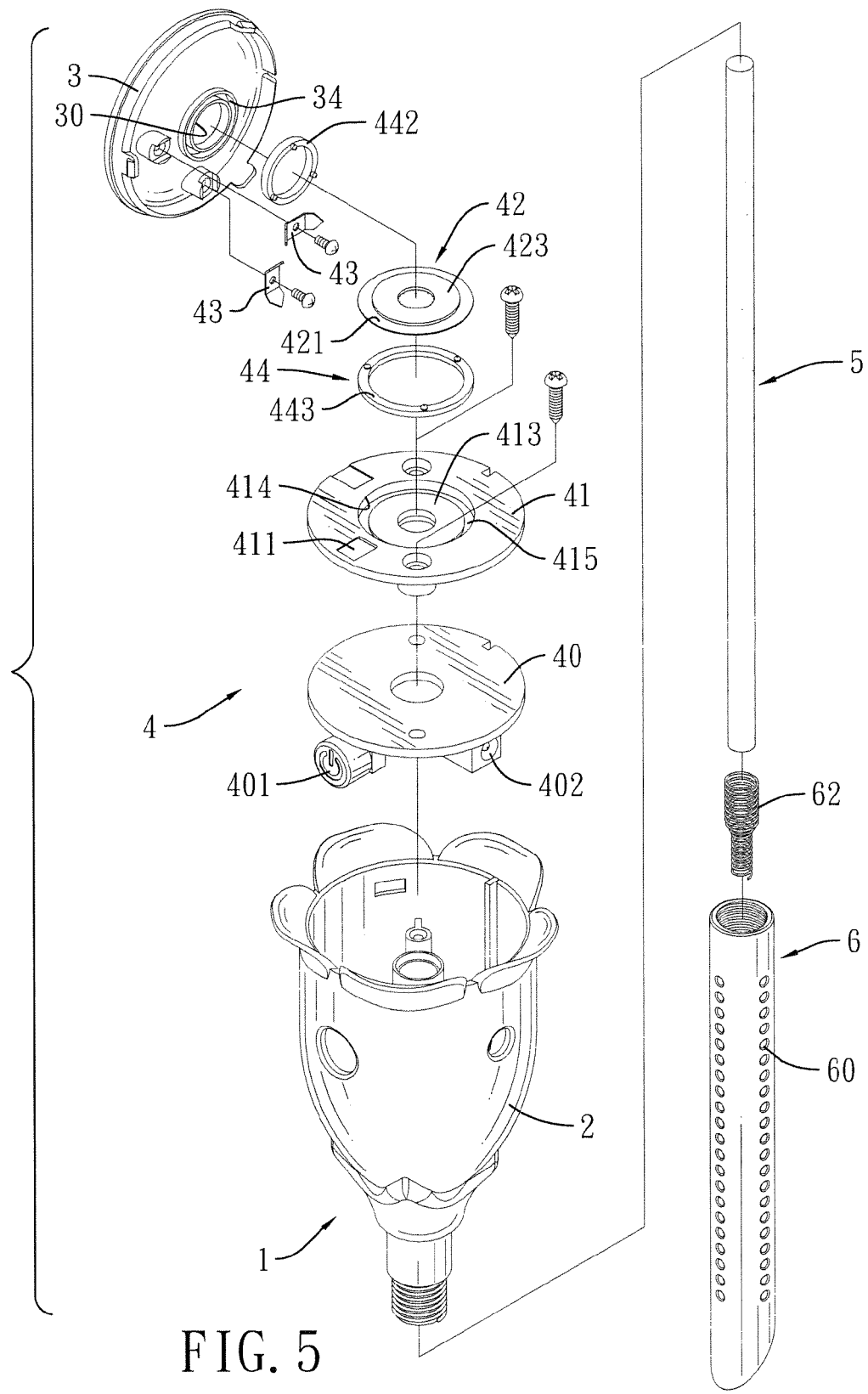
FIG. 5 is an exploded perspective view of a humidifier comprising a case, a water absorbing assembly, a water filtering assembly, and a second embodiment of an ultrasonic oscillating device of this invention.
Figure 6:
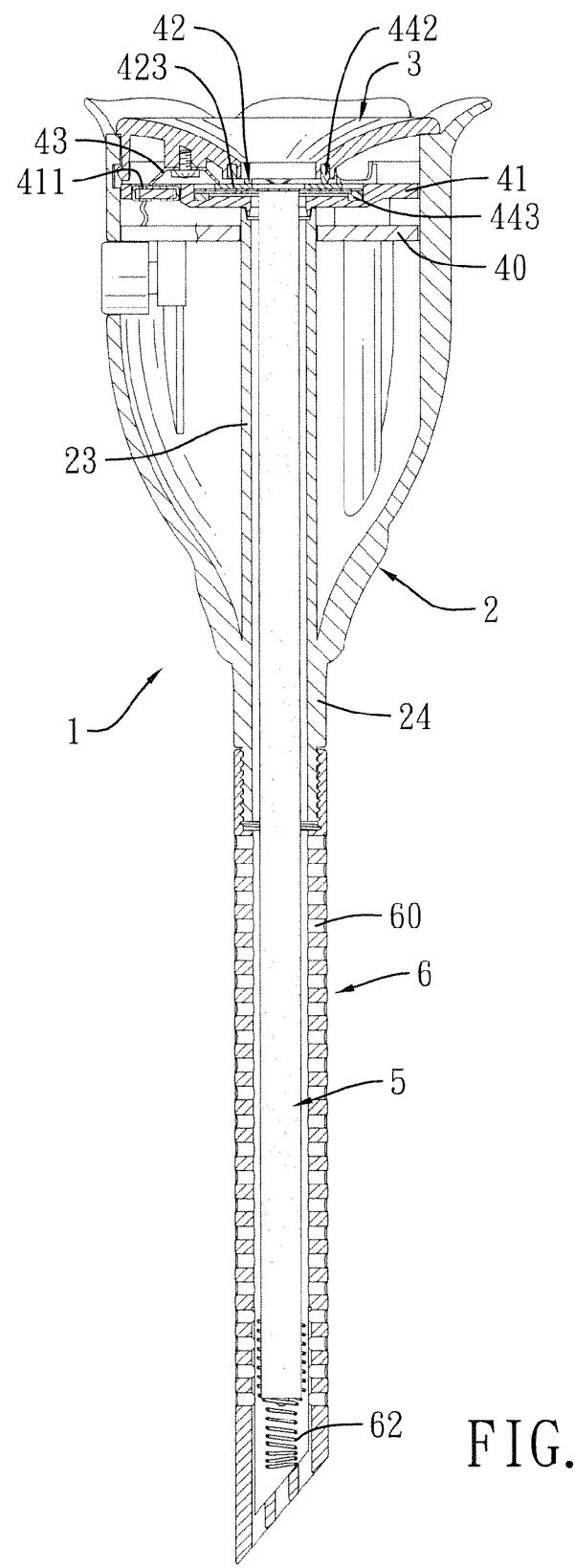
FIG. 6 is a cross sectional view of the second embodiment of the ultrasonic oscillating device comprising a case, a water absorbing assembly, and a water filtering assembly in FIG. 5.

FIGS. 5 and 6 show a second embodiment. The elastic positioning assembly 44 comprises an annular upper elastic positioning element 442 and an annular lower elastic positioning element 443. The annular groove 415 is formed in the circular groove 414 of the supporting part 413 of the supporting board 41. The annular lower elastic positioning element 443 is mounted in the annular groove 415. The bottom surface of the metal sheet 421 of the ultrasonic oscillating assembly 42 is abutted against the top surface of the annular lower elastic positioning element 443. A second positioning groove 34 is formed on the bottom of the lid 3 around the spraying hole 30. The annular upper elastic positioning element 442 is mounted in the second positioning groove 34. A top surface of the ultrasonic oscillator 423 of the ultrasonic oscillating assembly 42 is abutted against the upper elastic positioning element 442, so the ultrasonic oscillating assembly 42 is separated from the bottom surface of the circular groove 414 of the supporting part 413 of the supporting board 41 and the bottom surface of the lid 3.

With reference to FIGS. 1, 3, 5, 6, 7 and 8, the water absorbing assembly 5 of the humidifier can be a cotton stick or made of any other materials for absorbing water or liquid. The water absorbing assembly 5 communicates with a bottom surface of the spraying area 422 of the metal sheet 421 of the ultrasonic oscillating assembly 42 through both the connecting tube 24 and the extending tube 23 of the first base 2 of the case 1. The water or the liquid can be transmitted to the spraying area 422 of the metal sheet 421 of the ultrasonic oscillating assembly 42 by the water absorbing assembly 5.

With reference to FIGS. 1, 3, 5, 6, 7 and 8, the water filtering assembly 6 of the humidifier can comprise multiple small filtering holes 60. The water filtering assembly 6 is assembled around and on the outer side of the water absorbing assembly 5. A top of the water filtering assembly 6 is detachably assembled to the bottom of the first base 2 for preventing impurity in the water or the liquid from directly attaching on the water absorbing assembly 5. In this embodiment, the water filtering assembly 6 can be a tube matching the stick-shaped water absorbing assembly 5. An elastic element 62 is mounted inside the bottom of the tubular water filtering assembly 6. The elastic element 62 can be a spring. The tubular water filtering assembly 6 is assembled around and on the outer side of the water absorbing assembly 5. Internal threads are formed in the top of the tubular water filtering assembly 6 for connecting to the connecting tube 24 of the bottom of the first base 2. The elastic element 62 is abutted against a bottom of the water absorbing assembly 5. The water absorbing assembly 5 is pushed upward by the elastic element 62 to keep touching the bottom surface of the spraying area 422 of the metal sheet 421.

Figure 7:
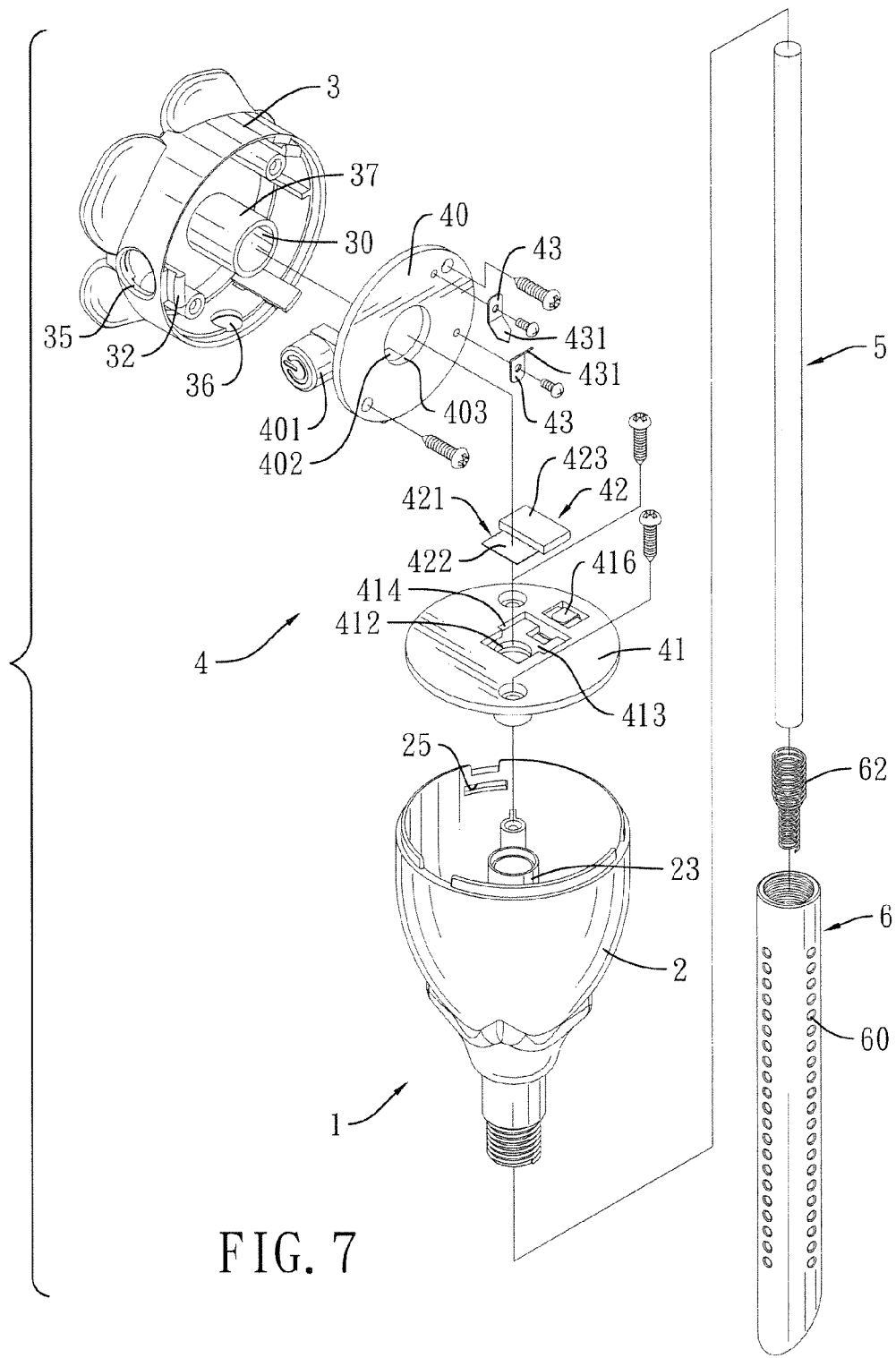
FIG. 7 is an exploded perspective view of a humidifier comprising a case, a water absorbing assembly, a water filtering assembly, and a third embodiment of an ultrasonic oscillating device of this invention.
Figure 8:
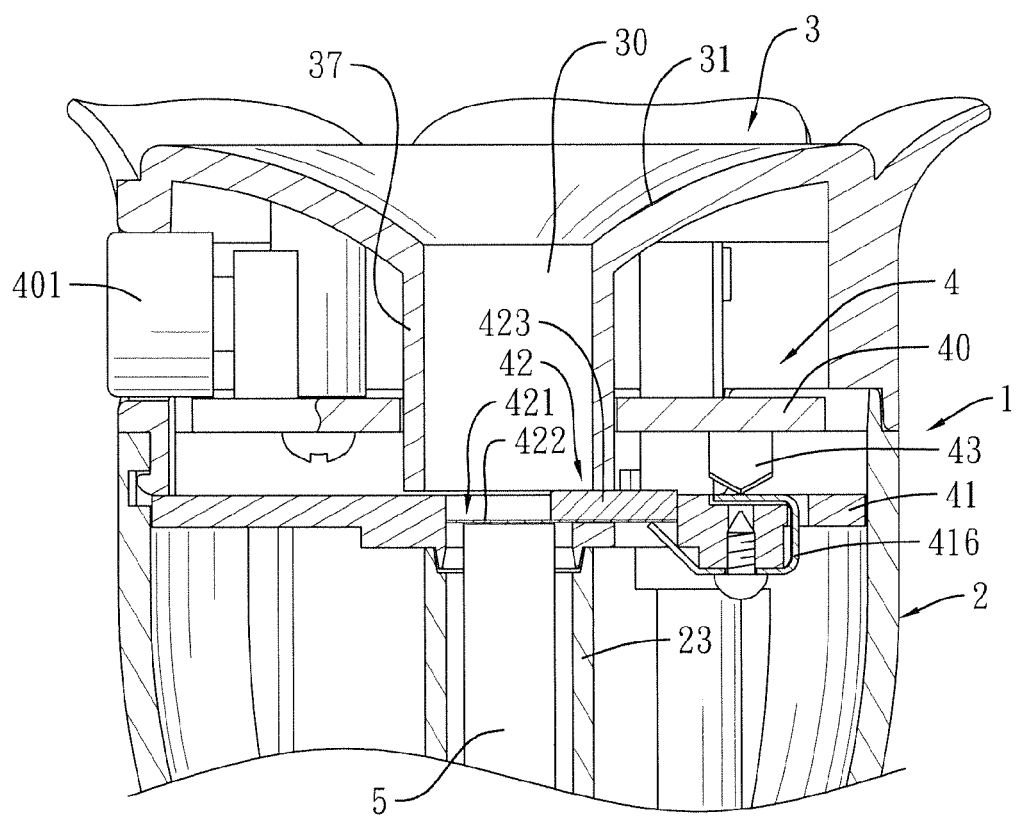
FIG. 8 is an enlarged cross sectional view of the third embodiment of the ultrasonic oscillating device comprising a case, a water absorbing assembly, and a water filtering assembly in FIG. 7.

FIGS. 7 and 8 show a third embodiment. The humidifier comprises a case 1, the water absorbing assembly 5, and the water filtering assembly 6.

The case 1 comprises a first base 2, a lid 3, and an ultrasonic oscillating device 4. The lid 3 is detachably mounted on a top of the first base 2. A space 21 is formed between the first base 2 and the lid 3. The first base 2 of the third embodiment is similar to the first base 2 shown in FIGS. 1 and 5. A funnel-shaped surface is formed around the top of the spraying hole 30 on the top of the lid 3. A lid tube 37 is formed on and extends from the edge of the spraying hole. The lid 3 and the first base 2 are assembled together by connector mounting or screwing. Multiple mounting recesses 25 are formed in an inner surface of the first base 2. Multiple mounting protrusions 32 corresponding to the multiple mounting recesses 25 are formed around the lid 3. When the lid 3 is assembled on the top of the first base 2, the multiple mounting protrusions 32 and the multiple mounting recesses 25 are respectively mounted together. However, the lid 3 still can be detached from the top of the first base 2. A third hole 35 and a fourth hole 36 are respectively formed through one side of the lid 3.

The ultrasonic oscillating device 4 comprises a circuit board 40, a supporting board 41, an ultrasonic oscillating assembly 42 and a connecting structure. In this embodiment, the connecting structure has two connecting elements 43. The circuit board 40 is mounted on the bottom of the lid 3. The circuit 40 comprises a switch 401 and a power connector 402. The switch 401 and the power connector 402 are exposed out of the first base 2 respectively by the third hole 35 and the fourth hole 36. A circuit hole 403 is formed through the circuit board 40 for the lid tube 37 of the lid 3 to pass through the circuit hole 403.

The supporting board 41 is mounted inside the first base 2. A conductive terminal 416 is formed around the supporting part 413 on the supporting board 41. The extending tube 23 of the first base 2 can be connected to a bottom of the supporting board 41 for communicating with the supporting hole 412. The water absorbing assembly 5 communicates with the supporting hole 412. A circular groove 414 is formed in the top of the supporting part 413. The ultrasonic oscillating assembly 42 is detachably assembled on the supporting part 413 of the supporting board 41. The ultrasonic oscillating assembly 42 is placed in the circular groove 414 of the supporting part 413, and positioned under the lid 3 of the case 1 and the circuit board 40. The ultrasonic oscillating assembly 42 is electrically connected to the conductive terminal 416 of the supporting board 41. The ultrasonic oscillating assembly 42 comprises a metal sheet 421 and a rectangular ultrasonic oscillator 423 placed around one side of the metal sheet 421. A spraying area 422 is formed on the metal sheet 421 and corresponds to the spraying hole 30 of the lid 3. Multiple micro-holes are formed through the spraying area 422. The lid tube 37 of the lid 3 extends to the spraying area 422 of the metal sheet 421.

The two connecting elements 43 are respectively mounted on the bottom of the lid 3, and are electrically connected to corresponding contacts of the circuit board 40. One of the connecting elements 43 is electrically connected to the ultrasonic oscillator 423. The other connecting element 43 is electrically connected to the conductive terminal 416. The ultrasonic oscillating assembly 42 and the circuit board 40 are electrically connected together. In this embodiment, the two connecting elements 43 are two conductive metal sheets and mounted on a bottom of the circuit board 40. Two ends of each connecting element 43 are bent downward as two touching terminals 431. The connecting elements 43 are respectively and electrically connected to the conductive terminal 416 of the supporting board 41 and the ultrasonic oscillator 423.

Figure 9:
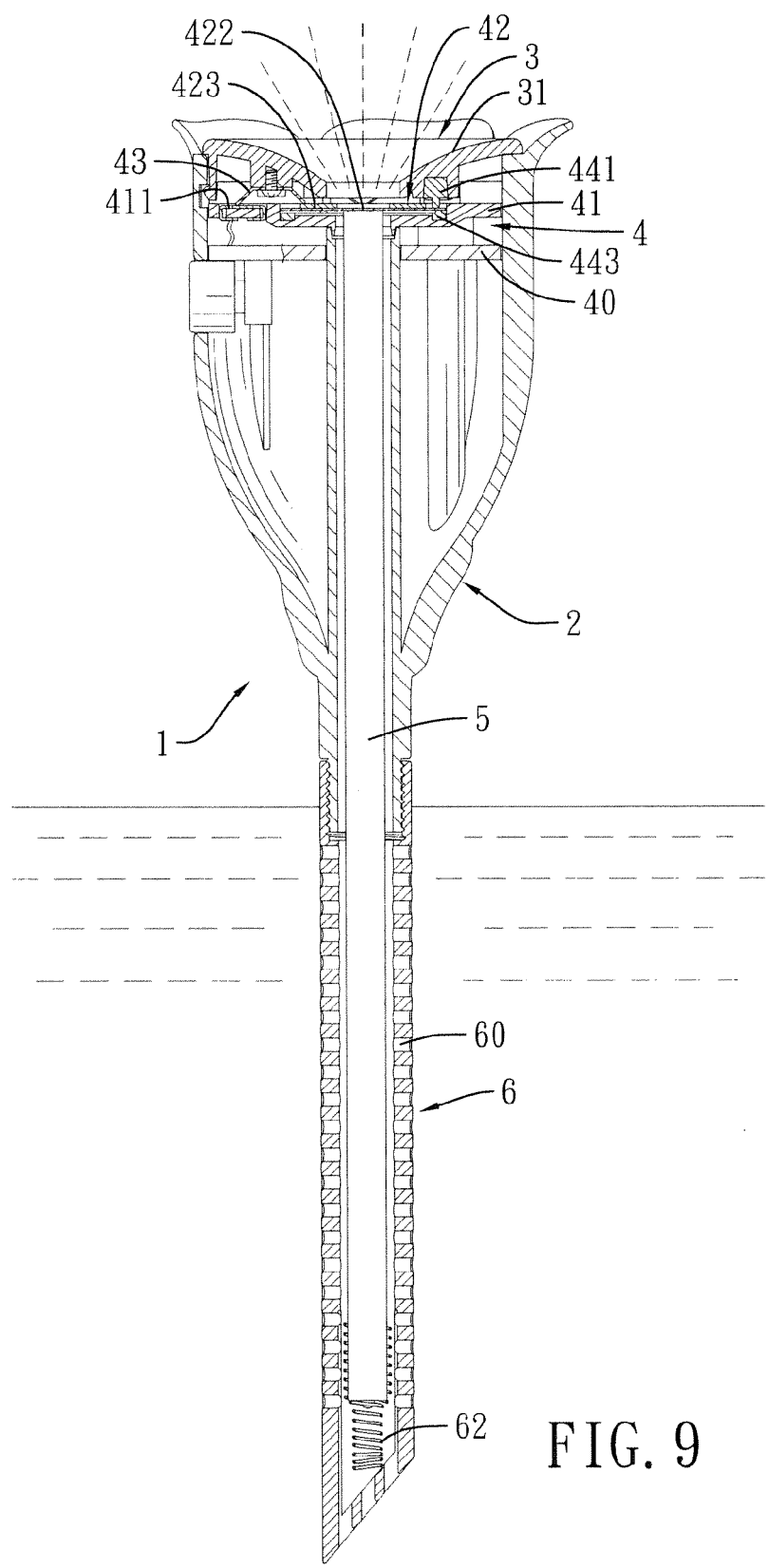
FIG. 9 is an operational view of a humidifier comprising a case, a water absorbing assembly, a water filtering assembly, and the first embodiment of the ultrasonic oscillating device in FIG. 1.
Figure 10:
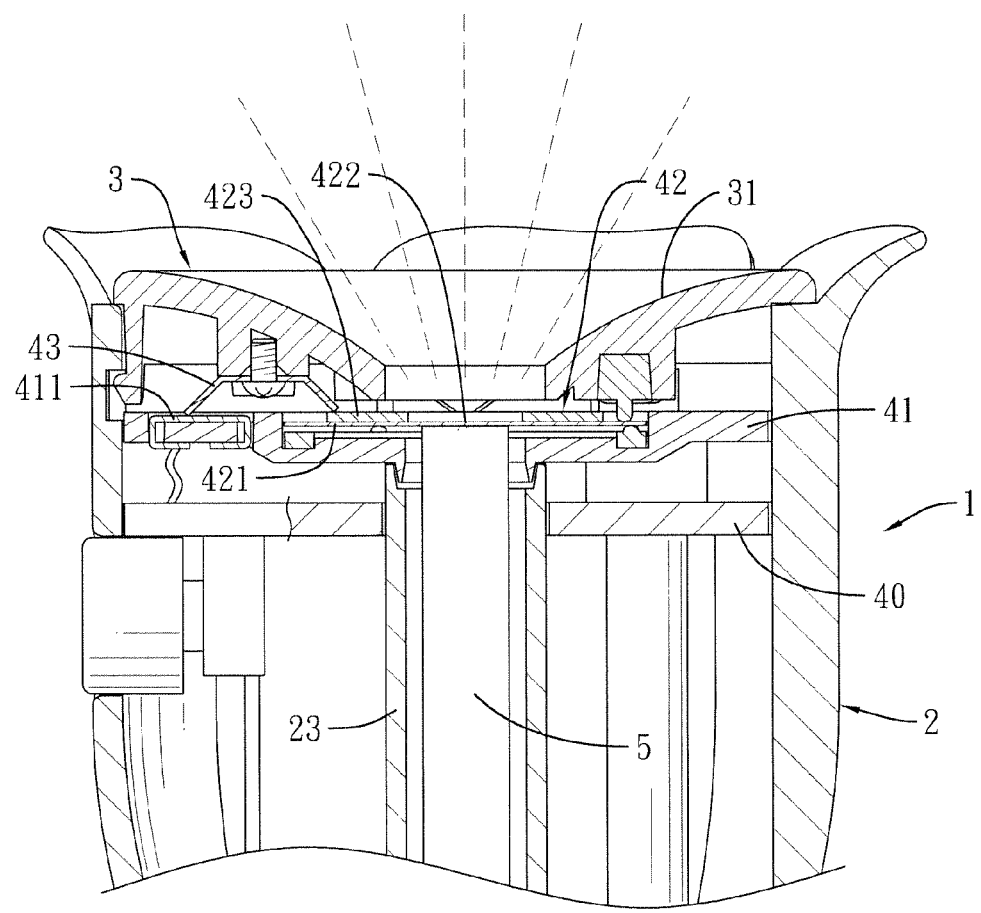
FIG. 10 is a partially enlarged view of FIG. 9.

With reference to FIGS. 1, 9, and 10, when the ultrasonic oscillating device 4 is applied in the humidifier, the water absorbing assembly 5 and the water filtering assembly 6 are immersed in water. The water filtering assembly 6 is assembled around and on the outer side of the water absorbing assembly 5 to filter out impurity in the water. The water can be transmitted to a bottom of the spraying area 422 of the metal sheet 421 of the ultrasonic oscillating assembly 42 by the water absorbing assembly 5. The ultrasonic oscillator 423 is applied with a voltage by the circuit board 40 for generating ultrasonic oscillations to transform the water to steam. The steam is distributed into air through the spraying hole 30 of the lid 3 for increasing the humidity. When water drops attach on the funnel-shaped surface 31 of the lid 3, the water drops will flow to the spraying area 422 of the metal sheet 421 through the spraying hole 30 of the lid 3 and the center hole 424 of the ultrasonic oscillator 423. The water drops can be transformed to steam by the ultrasonic oscillator 423.

When the ultrasonic oscillating assembly 42 is broken, users can take off the lid 3 of the case 1. The two connecting elements 43 are connected between the ultrasonic oscillator 423 and the connecting terminals 411 of the supporting board 41, and are removed with the lid 3. The users can remove the broken ultrasonic oscillating assembly 42 from the supporting board 41, and replace the broken ultrasonic oscillating assembly 42. After the lid 3 is assembled to the first base 2, the humidifier still can be used.

Figure 11:
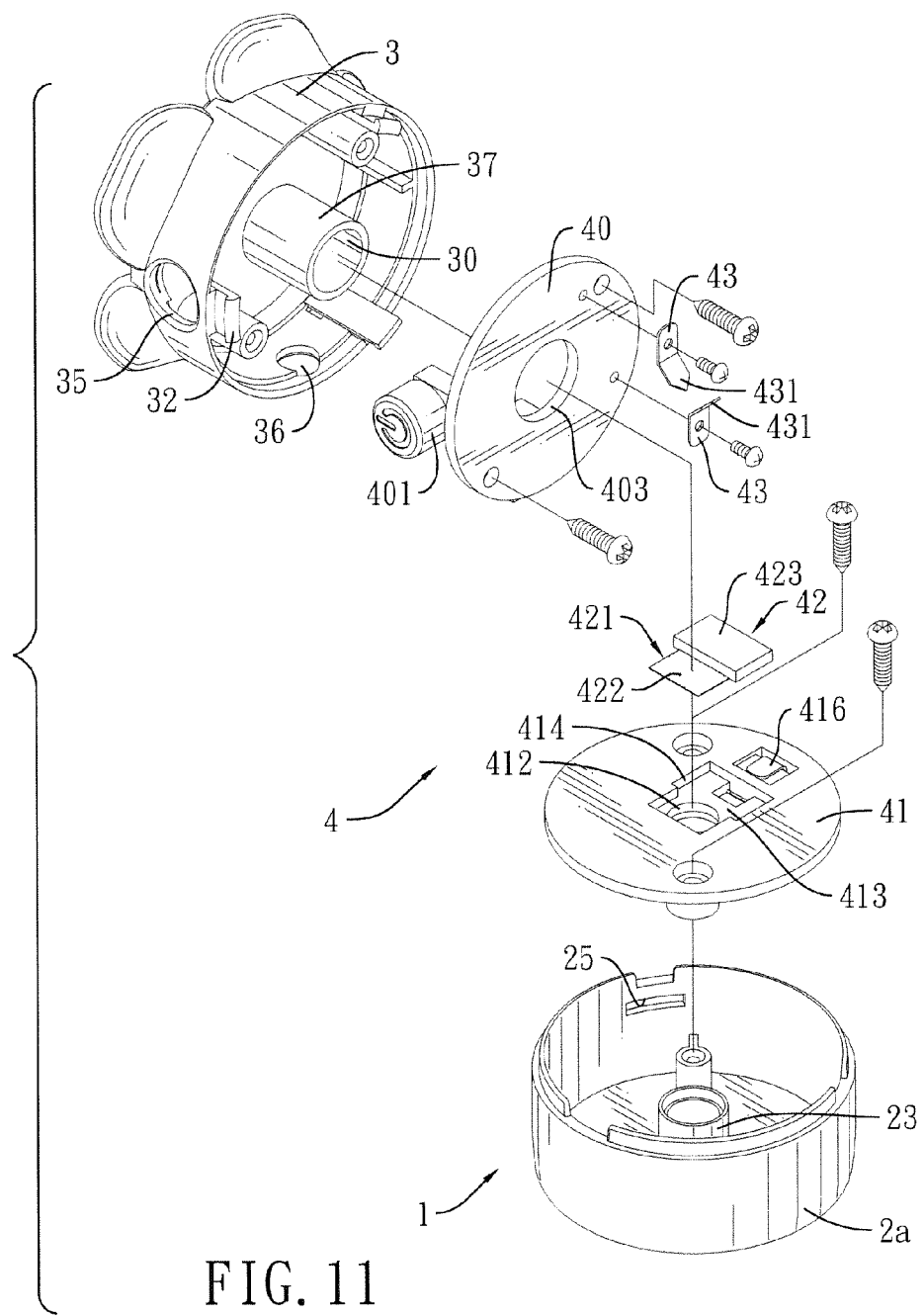
FIG. 11 is an exploded perspective view of a humidifier comprising a case, and a fourth embodiment of an ultrasonic oscillating device of this invention.
Figure 12:
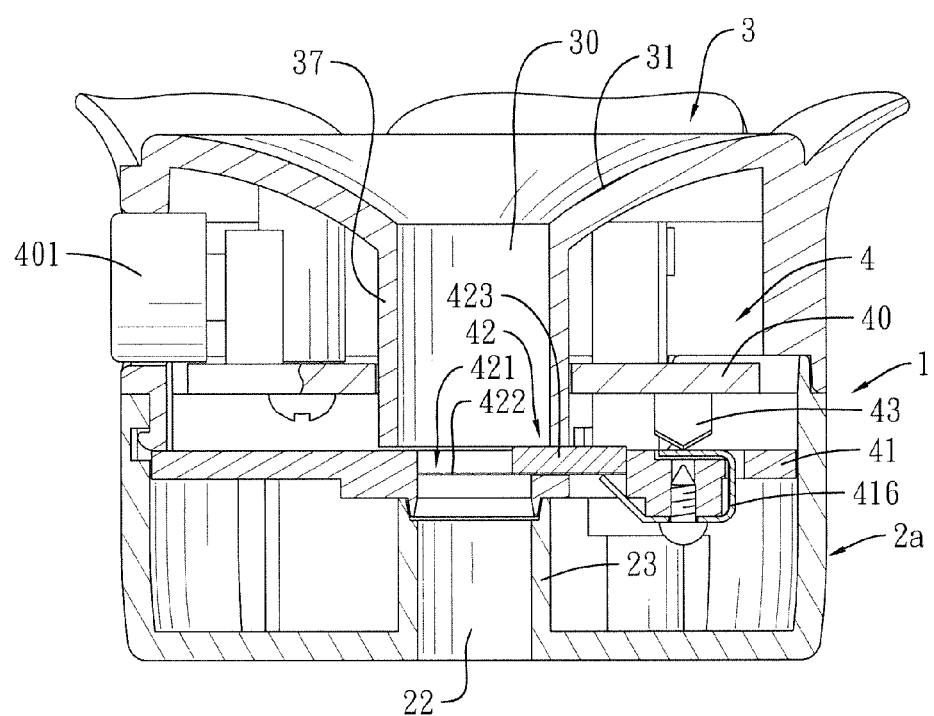
FIG. 12 is an enlarged cross sectional view of the fourth embodiment of the ultrasonic oscillating device comprising a case in FIG. 11.

FIGS. 11 and 12 show a fourth embodiment of an ultrasonic oscillating device 4 of this invention. A humidifier comprises a case 1 and the fourth embodiment of the ultrasonic oscillating device 4 without the water absorbing assembly 5.

The case 1 comprises a second base 2a and a lid 3 that can be detached from a top of the second base 2a. The second base 2a has a top opening communicating with a space 21. An extending tube 23 is mounted inside the space 21 of the second base 2a. A base hole 22 is formed through a bottom of the second base 2a. The lid 3 as shown in FIG. 11 and the lid 3 as shown in FIG. 7 are the same. When the lid 3 is assembled on the top of the second base 2a, the multiple mounting protrusions 32 and the multiple mounting recesses 25 are respectively mounted together. However, the lid 3 still can be detached from the second base 2a.

The ultrasonic oscillating device 4 of the fourth embodiment and the ultrasonic oscillating device 4 of the third embodiment are the same. Different from the third embodiment of FIG. 7 and the fourth embodiment of FIG. 11, the second base 2a of the case 1 does not comprise the water absorbing assembly 5 and the water filtering assembly 6, so the metal sheet 421 of the ultrasonic oscillating assembly 42 does not contact the water absorbing assembly 5.

Figure 13:
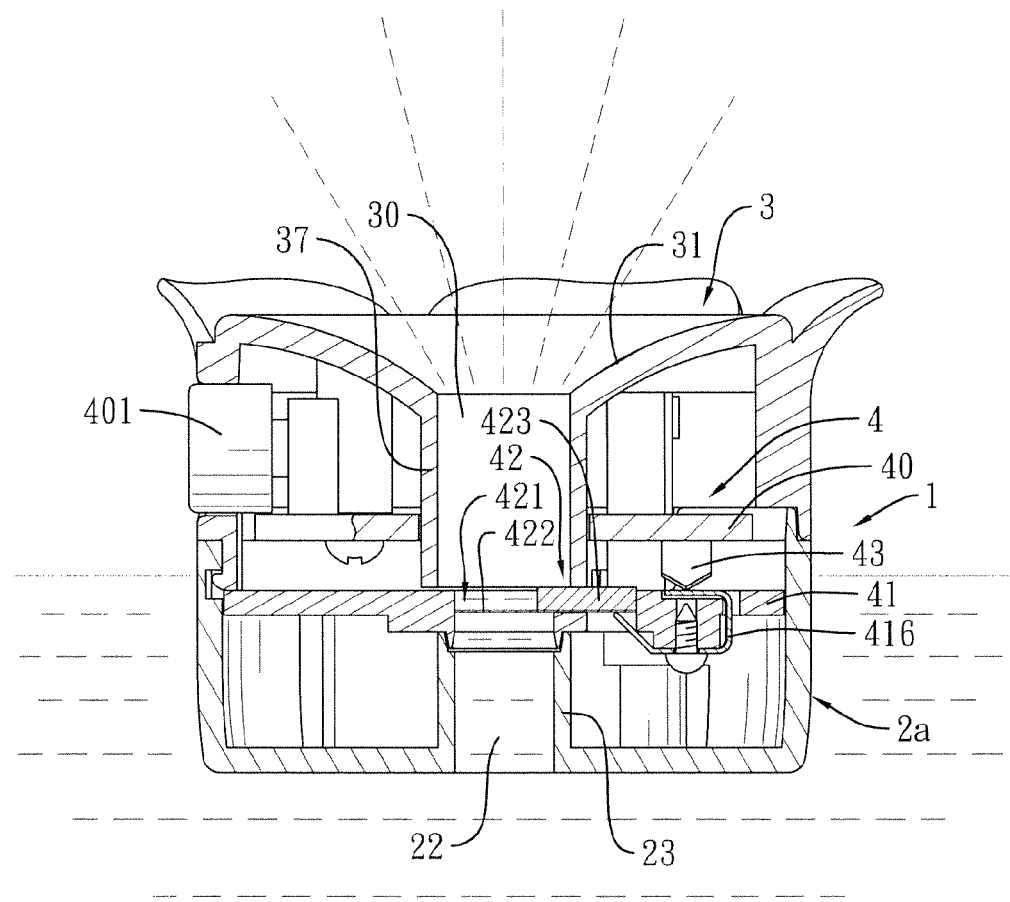
FIG. 13 is an operational view of a humidifier comprising a case and the fourth embodiment of the ultrasonic oscillating device in FIG. 11.

FIG. 13 shows a humidifier comprising the case 1 and the fourth embodiment of the ultrasonic oscillating device 4 without the water absorbing assembly 5, and floating on water.

When the case 1 is floated on water, the bottom of the second base 2a is immersed in the water. The water can flow through the base hole 22 of the second base 2a and the extending tube 23 to the bottom of the spraying area 422 of the metal sheet 421 of the ultrasonic oscillating assembly 42. The ultrasonic oscillator 423 is applied with a voltage by the circuit board 40 for generating oscillations. The water around the spraying area 422 of the metal sheet 421 can be transformed to steam. The steam is distributed into air through the spraying hole 30 of the lid 3 for increasing the humidity.

When the ultrasonic oscillating assembly 42 is broken, users can take off the lid 3 of the case 1. The two connecting elements 43 are connected between the ultrasonic oscillator 423 and the connecting terminal 411 of the supporting board 41, and are removed with the lid 3. The users can remove the broken ultrasonic oscillating assembly 42, and replace the broken ultrasonic oscillating assembly 42. After the lid 3 is assembled on the second base 2a, the humidifier still can be used.

What is claimed is:

1. An ultrasonic oscillating device with a detachable ultrasonic oscillating assembly, the ultrasonic oscillating device for being mounted in a case having a detachable lid and a spraying hole formed through the lid, the ultrasonic oscillating device comprising:
   a circuit board;
   a supporting board having a supporting part;
   an ultrasonic oscillating assembly detachably assembled on the supporting part of the supporting board and placed under the lid of the case, the ultrasonic oscillating assembly comprising:
      a metal sheet having a spraying area with multiple micro-holes; and
      an ultrasonic oscillator combined with the metal sheet; and
   a connecting structure formed under the lid and electrically connected to the ultrasonic oscillator and the circuit board.

2. The ultrasonic oscillating device as claimed in claim 1, wherein
   the supporting board is mounted on the circuit board;
   two connecting terminals are mounted around the supporting part of the supporting board and electrically connected to the circuit board;
   a center hole is formed through the ultrasonic oscillator of the ultrasonic oscillating assembly and corresponds to the spraying area of the metal sheet and the spraying hole of the lid; and
   the connecting structure has two connecting elements mounted on a bottom of the lid, and the two connecting elements respectively connect the ultrasonic oscillator and the metal sheet to the two connecting terminals of the supporting board, so the ultrasonic oscillating assembly is electrically connected to the circuit board.

3. The ultrasonic oscillating device as claimed in claim 2, wherein the ultrasonic oscillating device comprises
   an elastic positioning assembly comprising:
      at least one upper elastic positioning element mounted on the bottom of the lid, and abutted against a top surface of the ultrasonic oscillating assembly; and
      at least one lower elastic positioning element mounted on the supporting board, and abutted against a bottom surface of the ultrasonic oscillating assembly; and
   the ultrasonic oscillating assembly is positioned between the supporting part of the supporting board and the lid of the case, and controlled to oscillate between the supporting board and the lid.

4. The ultrasonic oscillating device as claimed in claim 3, wherein
   the elastic positioning assembly comprises multiple columnar upper elastic positioning elements and an annular lower elastic positioning element;
   a circular groove is formed in the supporting part of the supporting board for placing the ultrasonic oscillating assembly;
   an annular groove is formed in the circular groove for placing the annular lower elastic positioning element;
   the metal sheet of the ultrasonic oscillating assembly is abutted against a top surface of the annular lower elastic positioning element; and
   the multiple columnar upper elastic positioning elements are mounted under the bottom surface of the lid, and abutted against the top surface of the ultrasonic oscillating assembly, so the ultrasonic oscillating assembly is separated from the bottom surface of the lid and a bottom surface of the circular groove of the supporting part of the supporting board.

5. The ultrasonic oscillating device as claimed in claim 3, wherein the elastic positioning assembly comprises an annular upper elastic positioning element and an annular lower elastic positioning element;

a circular groove is formed in the supporting part of the supporting board for placing the ultrasonic oscillating assembly;

an annular groove is formed in the circular groove for placing the annular lower elastic positioning element;

the metal sheet of the ultrasonic oscillating assembly is abutted against a top surface of the annular lower elastic positioning element; and the annular upper elastic positioning element is mounted under the bottom surface of the lid and abutted against the top surface of the ultrasonic oscillating assembly, so the ultrasonic oscillating assembly is separated from the bottom surface of the lid and a bottom surface of the circular groove of the supporting part of the supporting board.

6. The ultrasonic oscillating device as claimed in claim 2, wherein
a supporting hole is formed through the supporting board and corresponds to a bottom of the spraying area of the metal sheet of the ultrasonic oscillating assembly; and
two ends of each connecting element are bent downward as two touching terminals to respectively connect to the connecting terminal of the supporting board and the ultrasonic oscillating assembly.

7. The ultrasonic oscillating device as claimed in claim 3, wherein
a supporting hole is formed through the supporting board and corresponds to a bottom of the spraying area of the metal sheet of the ultrasonic oscillating assembly; and
two ends of each connecting element are bent downward as two touching terminals to respectively connect to the connecting terminal of the supporting board and the ultrasonic oscillating assembly.

8. The ultrasonic oscillating device as claimed in claim 4, wherein
a supporting hole is formed through the supporting board and corresponds to a bottom of the spraying area of the metal sheet of the ultrasonic oscillating assembly; and
two ends of each connecting element are bent downward as two touching terminals to respectively connect to the connecting terminal of the supporting board and the ultrasonic oscillating assembly.

9. The ultrasonic oscillating device as claimed in claim 5, wherein
a supporting hole is formed through the supporting board and corresponds to a bottom of the spraying area of the metal sheet of the ultrasonic oscillating assembly; and
two ends of each connecting element are bent downward as two touching terminals to respectively connect to the connecting terminal of the supporting board and the ultrasonic oscillating assembly.

10. The ultrasonic oscillating device as claimed in claim 6, wherein the circuit board comprises a switch and a power connector exposed from the case.

11. The ultrasonic oscillating device as claimed in claim 7, wherein the circuit board comprises a switch and a power connector exposed from the case.

12. The ultrasonic oscillating device as claimed in claim 8, wherein the circuit board comprises a switch and a power connector exposed from the case.

13. The ultrasonic oscillating device as claimed in claim 9, wherein the circuit board comprises a switch and a power connector exposed from the case.

14. The ultrasonic oscillating device as claimed in claim 1, wherein
the circuit board is mounted inside the lid;
the ultrasonic oscillating assembly of the supporting board is placed under the circuit board;
a conductive terminal is mounted around the supporting part of the supporting board;
a supporting hole is formed through the supporting part for allowing a water absorbing assembly to extend through the supporting part;
the ultrasonic oscillator of the ultrasonic oscillating assembly is mounted on one side of the top surface of the metal sheet;
the spraying area of the metal is on one side of the ultrasonic oscillator;
the connecting structure has two connecting elements mounted on a bottom surface of the circuit board and the two connecting elements electrically connected to the circuit board, so the circuit board is electrically connected to the conductive terminal of the supporting board and the ultrasonic oscillating assembly.

15. The ultrasonic oscillating device as claimed in claim 14, wherein two ends of each connecting element are bent downward as two touching terminals to respectively connect to the conductive terminal of the supporting board and the ultrasonic oscillating assembly.

16. The ultrasonic oscillating device as claimed in claim 15, wherein the circuit board comprises a switch and a power connector exposed from the case.

* * * * *